United States Patent [19]

Lumpe et al.

[11] Patent Number: 5,497,925
[45] Date of Patent: Mar. 12, 1996

[54] ROOF RAIL FOR MOTOR VEHICLES

[75] Inventors: Karl-Heinz Lumpe; Klaus Kolodziej, both of Wuppertal, Germany

[73] Assignee: Happich Fahrzeug-Dachsysteme GmbH, Wuppertal, Germany

[21] Appl. No.: 259,893

[22] Filed: Jun. 15, 1994

[30]     Foreign Application Priority Data

Jul. 10, 1993 [DE] Germany .......................... 43 23 098.9

[51] Int. Cl.[6] ................................................. B60R 9/04
[52] U.S. Cl. ............................................ 224/326; 224/309
[58] Field of Search ................................... 224/309, 325, 224/326, 42.45 R, 316, 319, 321, 322, 327, 326, 321

[56]           References Cited

U.S. PATENT DOCUMENTS

| | | | |
|---|---|---|---|
| 3,724,730 | 4/1973 | Olsen et al. | 224/42.1 D |
| 4,162,755 | 7/1979 | Bott | 224/326 |
| 4,277,009 | 7/1981 | Bott | 224/321 |
| 4,279,368 | 7/1981 | Kowalski | 224/326 |
| 4,299,346 | 11/1981 | Helm | 224/326 |
| 4,341,332 | 7/1982 | Kowalski et al. | 224/326 |
| 4,673,119 | 6/1987 | Bott | 224/326 |
| 5,016,799 | 5/1991 | Stapleton | 224/326 |
| 5,069,377 | 12/1991 | Baughman | 224/326 |
| 5,253,792 | 10/1993 | Foster et al. | 224/321 |

FOREIGN PATENT DOCUMENTS

| | | |
|---|---|---|
| 8136803 | 5/1982 | Germany . |
| 3539449 | 5/1987 | Germany . |
| 3720403 | 12/1988 | Germany . |
| 4004829 | 8/1991 | Germany . |

*Primary Examiner*—Henry J. Recla
*Assistant Examiner*—Gregory M. Vidovich
*Attorney, Agent, or Firm*—Ostrolenk, Faber, Gerb & Soffen

[57]               ABSTRACT

A roof rack for a vehicle having two parallel rail tubes. Each rail tube is a hollow tube supported at its end regions by respective support feet fastenable to the roof surface. Each support foot includes a metal adapter with a plate on the vehicle roof and an upstanding adapter support to be fastened to the rail tube. A threaded plate is disposed in the tube at each adapter support for the adapter so that a fastening bolt can extend through the adapter, through a hole in the tube and into the fastening plate in the tube for securing the tube to the adapter. An additional resilient washer at the plate of the adapter at the roof of the vehicle. A third foot between the end regions of the rail tube may also be provided.

10 Claims, 2 Drawing Sheets

ROOF RAIL FOR MOTOR VEHICLES

BACKGROUND OF THE INVENTION

The present invention relates to a roof rack for motor vehicles. The rack includes a rack tube which is supported at its end regions by support feet which can be fastened to the surface of the roof of the vehicle and which is possibly also supported by a support foot which supports the central region of the rack tube.

Vehicles are today increasingly being equipped with a roof rack, typically including two rack tubes carried on support feet, extending approximately parallel to each other in the longitudinal direction of the vehicle and located close to the longitudinal edges of the surface of the roof. Transverse carriers which receive loads can be fastened to the rack tubes.

Traditional roof racks generally have the disadvantages that they are difficult to manufacture and thus too expensive, and that specially trained persons are necessary in order to install them on the vehicle roof.

SUMMARY OF THE INVENTION

The object of the present invention therefore is to provide a roof rack of the aforementioned type which is characterized by simple, and thus, inexpensive manufacture, low weight, and ease of installation.

In order to achieve this purpose, the support feet of the roof rack are to be firmly attached by fastening means to the roof rack and each is formed of a metal adapter and a plastic covering body which can be clipped over the adapter.

Various advantages are obtained with the invention. First, the roof rack is substantially simpler to manufacture since the support feet need no longer be developed as bulky metal bodies with a surface which must be treated in an expensive manner. Each support foot can instead comprise an easily shaped metal body which requires no surface treatment such as grinding, polishing or the like, and can comprise a covering body, which surrounds all or part of the metal body or adapter and which covering merely appears to form the support foot. Since the covered-over metal adapters merely serve a support function but not a decorative function, their size and weight can be kept very small, so that the roof rack can be relatively light, as compared with traditional racks. Differing from known designs, the subsequent placement of covering bodies on the adapters makes it possible to fasten the roof rack from above onto the roof of the vehicle merely under visual control. This, in turn, makes it possible to attach the roof rack subsequently on the vehicle, since merely a slight amount of mechanical skill is required for mounting, and special training for mounting the rack is not needed.

In detail, in the roof rack of the invention, each adapter has a fastening plate which rests on the surface of the roof and which has passage holes for attachment means by which the adapters are fastened to the roof of the vehicle. Each adapter has a support body which extends upward from the fastening plate. A further passage hole extends through both the fastening plate and the support body. It serves for the passage of the fastening means by which the adapter is fastened to the rack rail tube. At least the two adapters which are seated at the end regions of the rack rail tube are fastened to the tube by means of a screw, which passes through a respective hole in the end region of the rail tube. The screw is tightened into a threaded plate which is arranged within the rack tube. A screw attachment is, of course, rapid, simple and inexpensive to produce. In addition, the use of a threaded plate has the advantage that the rack tube can be developed with relatively thin walls since the hole through the tube need not be provided with an internal thread in order to hold the screw.

At least the central adapter may be fastened by a blind rivet which passes through a hole provided in the rack rail tube.

As a further development of the invention, the adapter is developed as a zinc die casting and the covering body is developed as a plastic injection molding. The adapter can be provided with projections or grooves for engagement on clip developments which are formed integrally on the covering bodies.

Damage to the surface of the roof or penetration of moisture can be easily avoided when each adapter is provided with a washer of soft elastic material which rests directly on the surface of the roof.

Other features and advantages of the present invention are explained below with reference to the drawings.

DESCRIPTION OF THE PREFERRED EMBODIMENT

Figure 1:
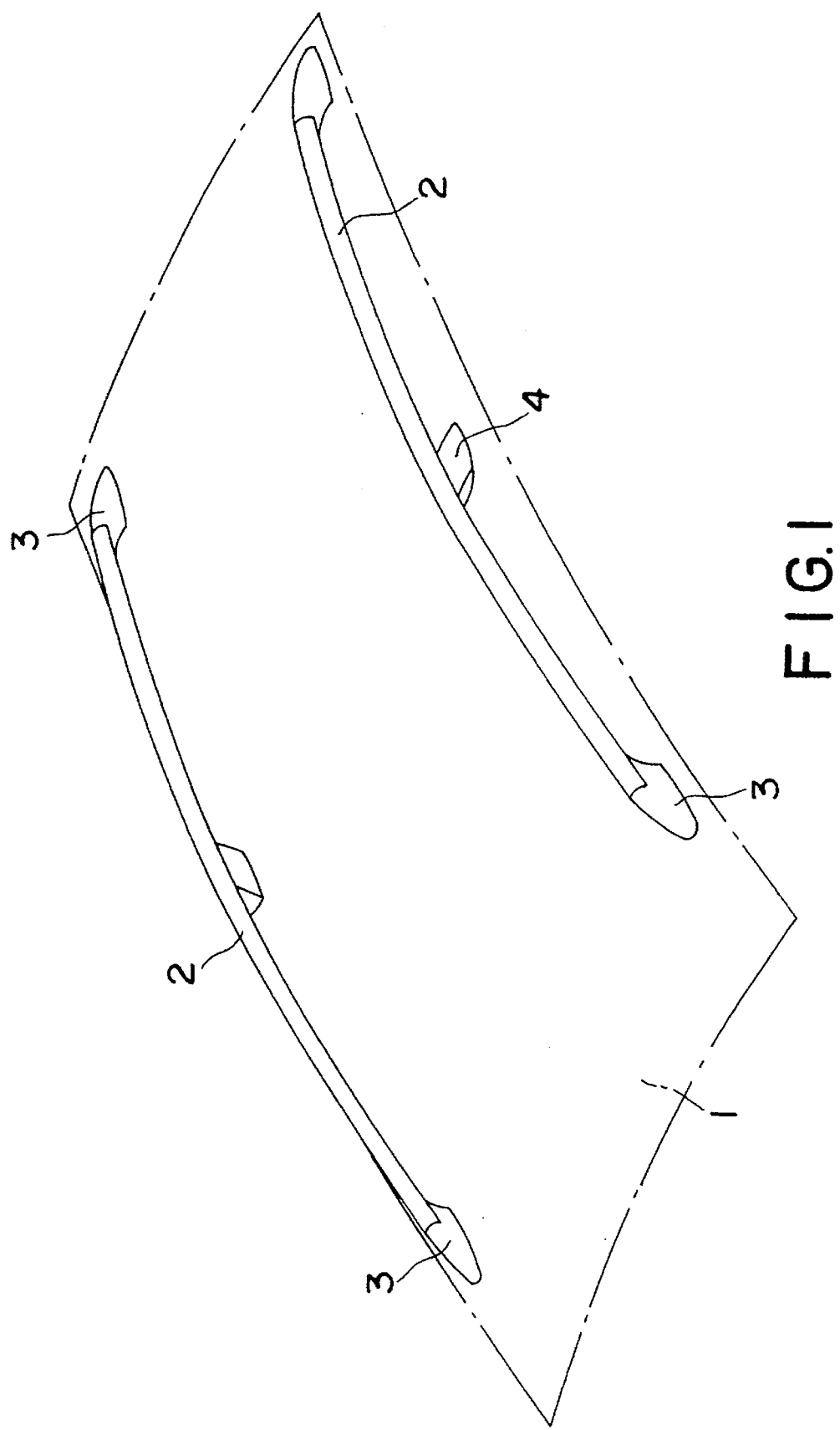
FIG. 1 is a perspective view of a complete roof rack arranged on the roof of a vehicle.
Figure 2:
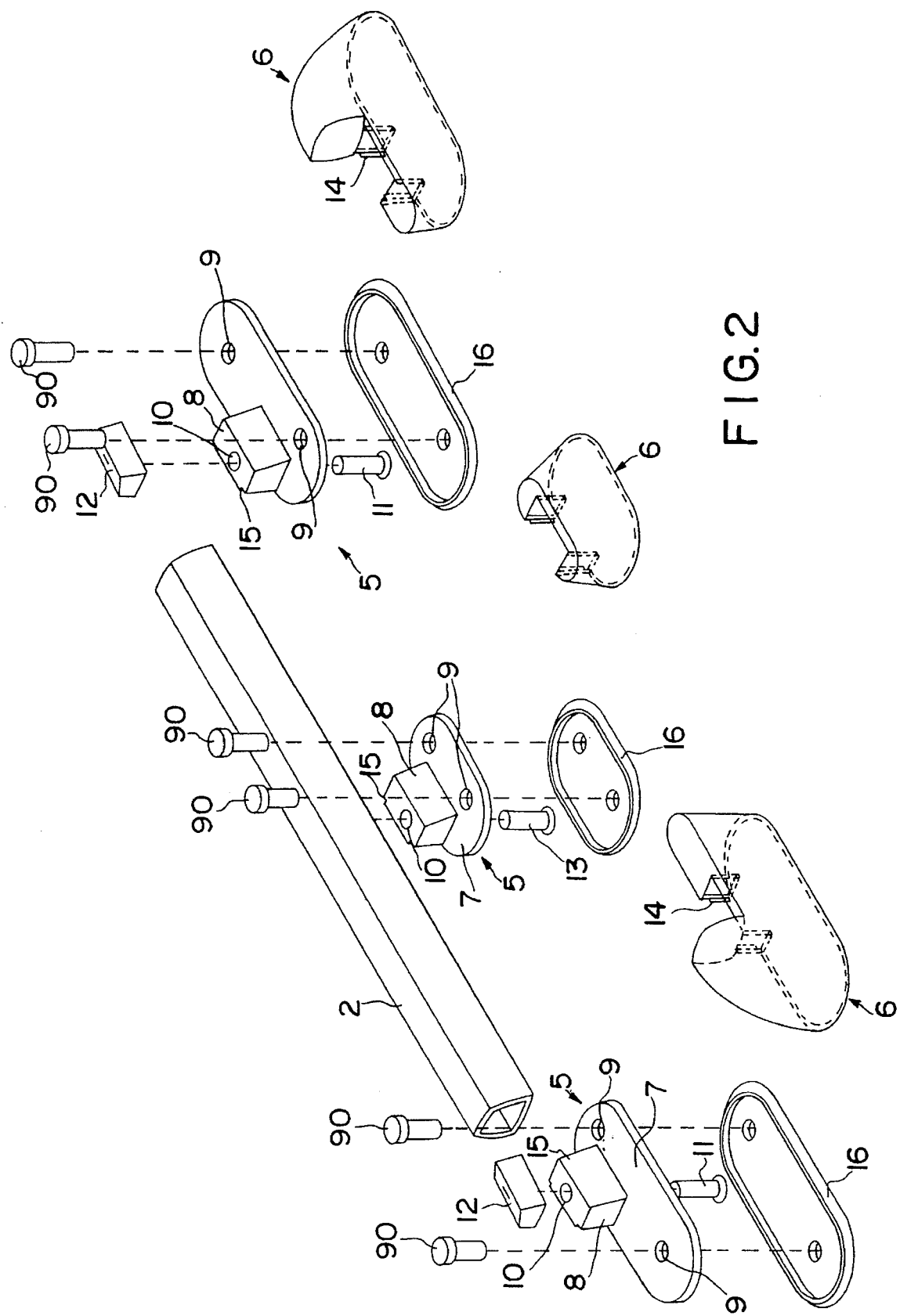
FIG. 2 is an exploded perspective view of the roof rack.

FIG. 1 shows, in dash-dot lines, a fragment of the roof 1 of a vehicle, the vehicle being not otherwise shown. Two rack rails 2 are fastened on the roof 1, one in the region of each longitudinal side edge of the surface of the roof. The development of each rail can be noted from the exploded view of FIG. 2, in which individual parts are shown in detail.

Each roof rack rail tube 2 is supported by at least two supporting feet 3, arranged at its two opposite end regions. For a longer rail tube 2, it is advisable to provide a third support foot 4 generally at the center of the rail tube. The rail tube 2 preferably is an extruded aluminum tube profile having a thickness of its tube wall which satisfies technical requirements.

Each support foot 3, 4 is developed in two parts comprising an adapter 5 of metal and a covering body 6 of plastic, which can be clipped to the metal adapter. Each adapter 5 is preferably developed as a zinc die casting. It is comprised of a fastening plate 7 which rests on the roof 1 of the vehicle and of a support body 8 which is integral with the plate 7 and extends vertically upward from it. Two holes 9 are provided in the fastening plate for the passage of fastening means 90 by which the adapters 5 can be fastened to the roof of the vehicle. Another hole 10 extends through the fastening plate 7 and the support member 8. Through the holes 10 in the outer support feet 3 there pass screws 11 which also pass through holes in the end regions of the rail tube 2 and are screwed into a threaded plate 12 which is arranged within the rail tube. Through the hole 10 of the middle support foot 4 there extends a thread-cutting screw (DIN 7500) 13 which also passes through a corresponding hole in the central region of the rail tube 2.

The support member 8 is arranged asymmetrically on the fastening plate 7 so that the adapter 5 can be inserted reversed. The adapter 5 of the support foot shown to the front left in FIG. 1 corresponds to the support foot present at the rear right. This is true also with regard to front right and back left. Of course, it is also possible to arrange the support member 8 symmetrically on the center of the fastening plate 7, but this would make the development and mounting of the covering body 6 more difficult.

Each covering body 6 has a dome shape with a clip development 14 formed on it. The clip development is adapted to cooperate with undercuts, grooves, or similar detent formations 15 on the support member 8 and possibly on the fastening plate 7, so that the covering member 6 can be mounted by being merely pushed on.

A washer 16 of soft elastic material is arranged on the fastening plate of the support feet 3 and 4 before the roof rail is placed on the roof 1 of the vehicle. The washer is intended to prevent scratching of the paint of the vehicle and to prevent the penetration of moisture into the threaded regions at the means 90 and 11 between the support feet 3, 4 and the roof of the vehicle.

The new roof rail has a good appearance since, for instance, the roof rail 2 can be aluminum-anodized and the covering body 6 can be painted, and they can be developed in a streamlined manner. In this connection, the wishes of the customers with regard to the color and shape desired can be complied with, for the most part. Furthermore, the new roof rail consists of only a few individual parts which are easy to connect to each other. Further, it is of only slight weight.

The mounting of the new roof rail on the roof 1 of the vehicle does not require any special skill and can be carried out from above under visual control. All fastening points are invisible to an observer after the cap shaped covering members 6 have been clipped on, so that the new roof rail may satisfy the aesthetic requirement of the customer.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roof rack adapted for attachment to a roof of a motor vehicle comprising:

a roof rail tube having opposite end regions, each end region having a hole; and a respective support foot at each end region of the roof rail tube for being fastened to the end region of the roof rail tube and to a surface of the roof, each support foot comprising:

a metal adapter connected to the rail tube and to the roof, the metal adapter including:

a fastening plate having passage holes therethrough for receiving roof fastening means for fastening the adapter to the roof;

a support member which extends upward from the fastening plate; and an additional passage hole extending through the fastening plate and the support member; and a rail fastening screw extending through the additional passage hole and into one of the holes in the roof rail tube for fastening the adapter to the rail tube;

a threaded plate located in the roof rail tube for receiving the rail fastening screw; and a plastic covering member shaped and adapted to be clipped onto the metal adapter.

2. The roof rack of claim 1, further comprising a third support foot disposed along the rail tube between the end regions thereof.

3. The roof rack of claim 1, wherein the adapter of each of the support feet is attached to an outer surface of the rail tube.

4. The roof rack of claim 2, further comprising a connecting piece for the third support foot located inside the rail tube at the position along the rail tube where the third support foot is located, and rail fastening means extending through the third support foot, into the tube and through the connecting piece in the rail tube for connecting the third support foot to the rail tube.

5. The roof rack of claim 2, wherein each of the support feet is attached to the rail tube on an outer surface of the rail tube.

6. The roof rack of claim 1, further comprising:

a third support foot disposed along the rail tube between the end regions thereof;

a thread cutting screw passing through the third support foot; and a hole in the rail tube for receiving the thread cutting screw.

7. The roof rack of claim 1, wherein the adapters are zinc die castings and the covering members are plastic injection moldings.

8. The roof rack of claim 1, wherein the adapters include detent formations thereon and the covering members include respective cooperating detent members thereon for detent clipping the covering members over the adapters.

9. The roof rack of claim 1, further comprising a washer of soft elastic material between the adapter and the surface of the roof for forming sealing protection there.

10. The roof rack of claim 1, wherein the respective support members are positioned asymmetrically on the respective fastening plate.

* * * * *